United States Patent
Hirase

(10) Patent No.: US 9,495,527 B2
(45) Date of Patent: Nov. 15, 2016

(54) FUNCTION-LEVEL LOCK FOR MOBILE DEVICE SECURITY

(71) Applicant: Samsung Electronics Company, Ltd., Suwon, Gyeonggi-Do (KR)

(72) Inventor: Yoshiya Hirase, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 14/144,347

(22) Filed: Dec. 30, 2013

(65) Prior Publication Data

US 2015/0186661 A1    Jul. 2, 2015

(51) Int. Cl.
*G06F 21/32* (2013.01)
*G06F 21/62* (2013.01)

(52) U.S. Cl.
CPC .......... *G06F 21/32* (2013.01); *G06F 21/6218* (2013.01)

(58) Field of Classification Search
CPC ...................... G06F 21/62; G06F 21/32; G06F 21/6218
USPC .......................................................... 726/28
See application file for complete search history.

(56) References Cited

U.S. PATENT DOCUMENTS

| 7,805,423 B1 | 9/2010 | Romine et al. |
|---|---|---|
| 2011/0088003 A1 | 4/2011 | Swink et al. |
| 2011/0099474 A1 | 4/2011 | Grossman |
| 2011/0154444 A1 | 6/2011 | Sriraghavan |
| 2011/0302505 A1 | 12/2011 | Koren |
| 2011/0311052 A1 | 12/2011 | Myers et al. |
| 2012/0009896 A1 | 1/2012 | Bandyopadhyay et al. |
| 2012/0032779 A1 | 2/2012 | Jaakkola |
| 2012/0060123 A1 | 3/2012 | Smith |
| 2012/0278744 A1 | 11/2012 | Kozitsyn et al. |
| 2013/0036377 A1 | 2/2013 | Colley |
| 2013/0080522 A1 | 3/2013 | Ren |
| 2013/0103641 A1 | 4/2013 | Rehman |
| 2013/0143512 A1 | 6/2013 | Hernandez et al. |

(Continued)

FOREIGN PATENT DOCUMENTS

| EP | 1775669 A1 | 4/2007 |
|---|---|---|
| EP | 2264641 A1 | 12/2010 |

OTHER PUBLICATIONS

Butkus, Heidi; "How to Keep Kids on the App of Your Choice"; Nov. 30, 2012, 16 pages.*

(Continued)

*Primary Examiner* — Hadi Armouche
*Assistant Examiner* — Angela Holmes
(74) *Attorney, Agent, or Firm* — Sherman IP LLP; Kenneth L. Sherman; Hemavathy Perumal

(57) ABSTRACT

One embodiment provides an electronic mobile device comprising one or more mobile applications. Each mobile application has at least one corresponding graphical user interface (GUI) screen for display on the mobile device. The mobile device includes a security system. For each mobile application, the security system maintains corresponding security data, wherein the corresponding security data represents one or more secure components of a corresponding GUI screen. The security system generates a GUI screen for a mobile application based on corresponding security data, wherein each secure component of the UI screen is locked. User access to a locked component of the GUI screen is permitted only after successful user verification.

20 Claims, 10 Drawing Sheets

(56) References Cited

U.S. PATENT DOCUMENTS

2013/0305392 A1* 11/2013 Bar-El et al. .................. 726/29

OTHER PUBLICATIONS

European Search Report dated Apr. 17, 2015 for European Application No. 14198156.3 from European Patent Office, pp. 1-8, Munich, Germany.

* cited by examiner

FUNCTION-LEVEL LOCK FOR MOBILE DEVICE SECURITY

TECHNICAL FIELD

One or more embodiments relate generally to security systems for mobile devices, and in particular a function-level lock for mobile device security.

BACKGROUND

Mobile devices such as smart phones, tablets and laptop computers are easy to steal or lose. Mobile device security is important to prevent unauthorized access to information (e.g., personal information) stored on a mobile device. A device lock is an example security solution that locks a display screen of a mobile device when the mobile device enters the sleep mode, and prompts a user to enter access information (e.g., a personal identification number (PIN), a password, or a pattern) to unlock the display screen when the user awakens the mobile device from the sleep mode. An application lock is another example security solution that locks a mobile application on a mobile device when a user signs out of the mobile application or after an idle period of time, and prompts the user to enter access information to unlock the mobile application when the user attempts to access the mobile application. These example security solutions, however, typically interfere with user experience.

SUMMARY

One embodiment provides an electronic mobile device comprising one or more mobile applications. Each mobile application has at least one corresponding graphical user interface (GUI) screen for display on the mobile device. The mobile device further comprises a security system. For each mobile application, the security system maintains corresponding security data, wherein the corresponding security data represents one or more secure components of a corresponding GUI screen. The security system generates a GUI screen for a mobile application based on corresponding security data, wherein each secure component of the UI screen is locked. User access to a locked component of the GUI screen is permitted only after successful user verification.

These and other aspects and advantages of one or more embodiments will become apparent from the following detailed description, which, when taken in conjunction with the drawings, illustrate by way of example the principles of one or more embodiments.

BRIEF DESCRIPTION OF THE DRAWINGS

For a fuller understanding of the nature and advantages of one or more embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One embodiment provides an electronic mobile device comprising one or more mobile applications. Each mobile application has at least one corresponding graphical user interface (GUI) screen for display on the mobile device. The mobile device further comprises a security system. For each mobile application, the security system maintains corresponding security data, wherein the corresponding security data represents one or more secure components of a corresponding GUI screen. The security system generates a GUI screen for a mobile application based on corresponding security data, wherein each secure component of the UI screen is locked. User access to a locked component of the GUI screen is permitted only after successful user verification.

Figure 1:
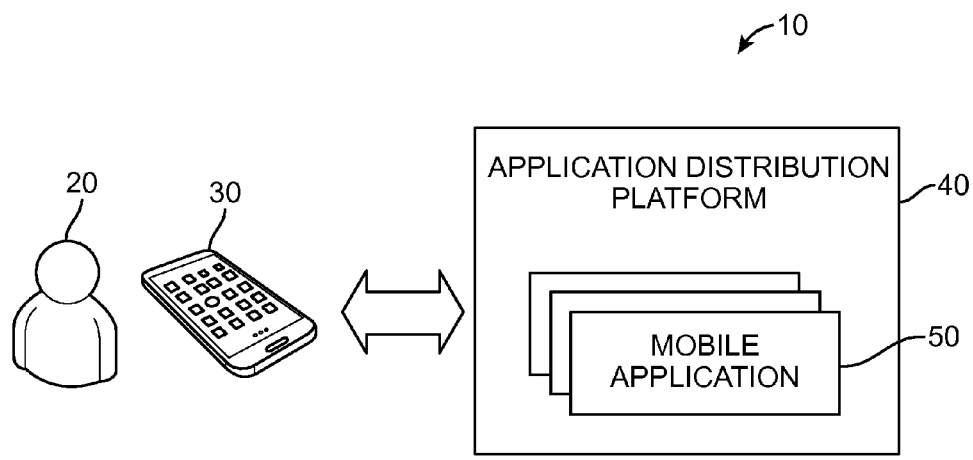
FIG. 1 illustrates an example network.

FIG. 1 illustrates an example network 10. The network 10 comprises at least one electronic mobile device 30. A mobile device 30 may be a mobile phone (e.g., a smart phone), a tablet, a laptop computer, etc. The network 10 further comprises at least one application distribution platform 40. The application distribution platform 40 maintains one or more mobile applications ("mobile apps") 50 for distribution. A mobile app 50 comprises a software application configured to run on a mobile device 30. A user 20 may download one or more mobile applications 50 from an application distribution platform 40 to a mobile device 30 over a connection (e.g., a wireless connection, a wired connection, or a combination of the two). A mobile device 30 may also be pre-loaded with one or more mobile apps 50.

Figure 2:
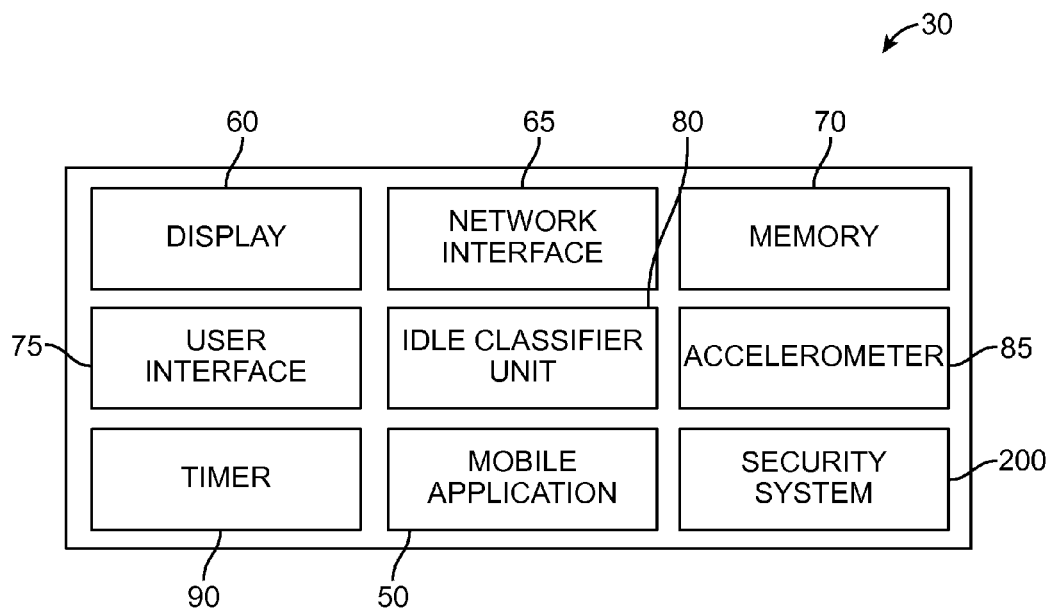
FIG. 2 illustrates a block diagram of an example mobile device, in accordance with an embodiment of the invention.

FIG. 2 illustrates a block diagram of an example mobile device 30, in accordance with an embodiment of the invention. The mobile device 30 comprises a display 60 for displaying content, a memory unit 70 for maintaining data, a network interface module 65 for enabling data exchange with an application distribution platform 40, a content distributor and/or another mobile device 30 via a network (e.g., cellular network, IP network), and a user interface module 75 for generating a graphical user interface (GUI) through which a user 20 may control the mobile device 30 (e.g., controlling content playback on the mobile device 30).

In one embodiment, the mobile device 30 has at least two operating modes, such as an awake mode and a low-power sleep mode. In the awake mode, the mobile device 30 is fully operational. In the sleep mode, the mobile device 30 is in a low power mode.

The mobile device 30 further comprises an accelerometer sampling unit 85 and an idle classifier unit 80. The sampling unit 85 obtains samples of sensor data relating to current user activity from one or more sensors of the mobile device 30. A mobile device 30 may include sensors such an image capture device for capturing video and/or images, an audio capture device for capturing audio, a magnetometer for measuring magnetic fields, a gyroscope for measuring orientation, and a light sensor for measuring lighting conditions of the ambient environment surrounding the mobile device 30, etc. The idle classifier unit 80 utilizes a small window of sensor sample data to determine whether the mobile device 30 should be placed in sleep mode or the awake mode. The mobile device 30 may further comprise a timer unit 90 for switching the mobile device 30 between the sleep mode and the awake mode.

The mobile device 30 further comprises one or more mobile apps 50 (e.g., a messaging application, a navigation application, a photo-sharing/video-sharing application, etc.).

The mobile device 30 further comprises a function-level security system 200. The function-level security system 200 provides fine-grained security locking and unlocking for at least one mobile app 50. Specifically, the security system 200 provides platform-level verification for user-defined security areas of a mobile app 50 without requiring any application modification to the mobile app 50. The security system 200 protects the functionality of a mobile app 50 while minimizing interference with user experience of the mobile app 50. The security system 200 is applicable to different operating systems of the mobile device 30.

Figure 3:
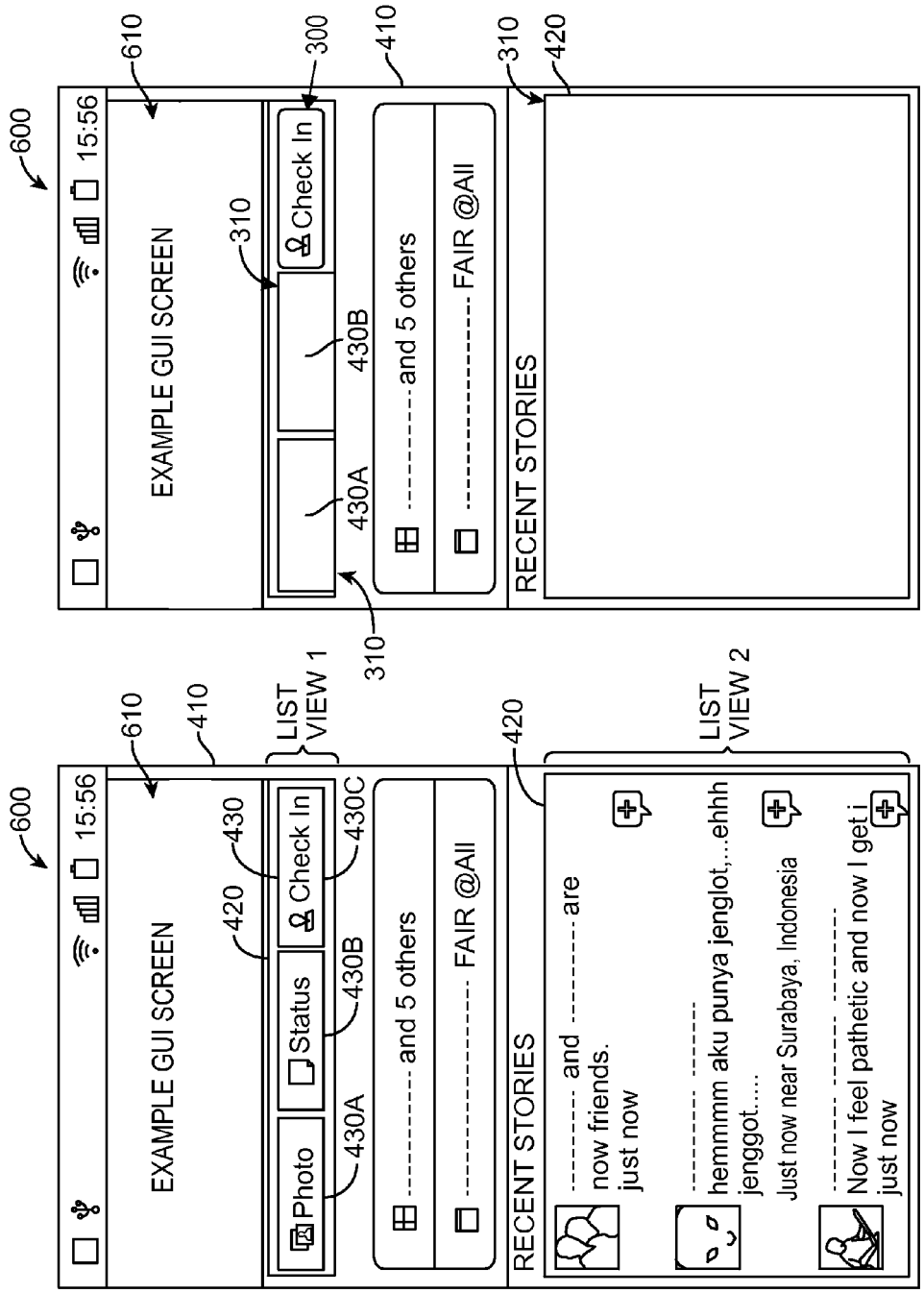
FIG. 3A illustrates an example graphical user interface (GUI) of a mobile app, in accordance with an embodiment of the invention.
FIG. 3B illustrates an example function-level lock of the mobile app in FIG. 3A, in accordance with an embodiment of the invention.

FIG. 3A illustrates an example graphical user interface (GUI) 600 of a mobile app 50, in accordance with an embodiment of the invention. A mobile app 50 has a corresponding GUI 600 for display on a display 60 of a mobile device 30. A user 20 of the mobile device 30 may control the mobile app 50 using the GUI 600 when the user 20 is using the mobile app 50. The GUI 600 may comprise at least one GUI screen 610. Each GUI screen 610 comprises a root window 410 including one or more GUI components 300, such as a list view 420 and a button 430. Each GUI component 300 of a root window 410 has a corresponding location representing where the GUI component 300 is positioned/overlayed on the root window 410.

For example, the root window 410 shown in FIG. 3A includes a first list view 420 (LIST VIEW 1) positioned within a top half of the root window 410, and a second list view 420 (LIST VIEW 2) positioned within a bottom half of the root window 410. The first list view 420 comprises multiple buttons 430. Each button 430 triggers a specific application function when activated by a user 20 using the mobile app 50. Specifically, a first button 430A ("photo button") enables photo-sharing, a second button 430B ("status button") enables updating a user status, and a third button 430C ("check-in button") enables logging a current user location. The second list view 420 also has a corresponding application function. As shown in FIG. 3A, the second list view 420 provides a timeline of comments and/or user status updates from people with whom the user 20 socially networks with.

FIG. 3B illustrates an example function-level lock of the mobile app 50 in FIG. 3A, in accordance with an embodiment of the invention. As described in detail later herein, the security system 200 allows a user 20 to define one or more security areas 310 within a GUI screen 410 of a mobile app 50. A security area 310 may include one or more GUI components 300.

When a user 20 utilizes a mobile app 50 before providing access information to verify/authenticate his/her identity, the security system 200 blocks/locks each GUI component 300 included within each security area 310 of the mobile app 50. Blocking/locking a GUI component 300 prevents user access to an application function/content provided by the blocked GUI component 300. The user 20, however, can still access/view GUI components 300 not within a security area 310 of the mobile app 50 without having to provide access information. A blocked/locked GUI component 300 is unlocked to permit user access only when the user 20 provides access information that successfully verifies/authenticates his/her identity.

For example, a user may define the photo button 430A, the status button 430B and the second list view 420 as security areas 310. As shown in FIG. 3B, the security system 200 blocks/locks each security area 310 by blurring the security area 310. A user 20 cannot access an application function/content provided by a GUI component 300 within a blurred security area 310 until the user 20 verifies/authenticates his/her identity.

Figure 4:
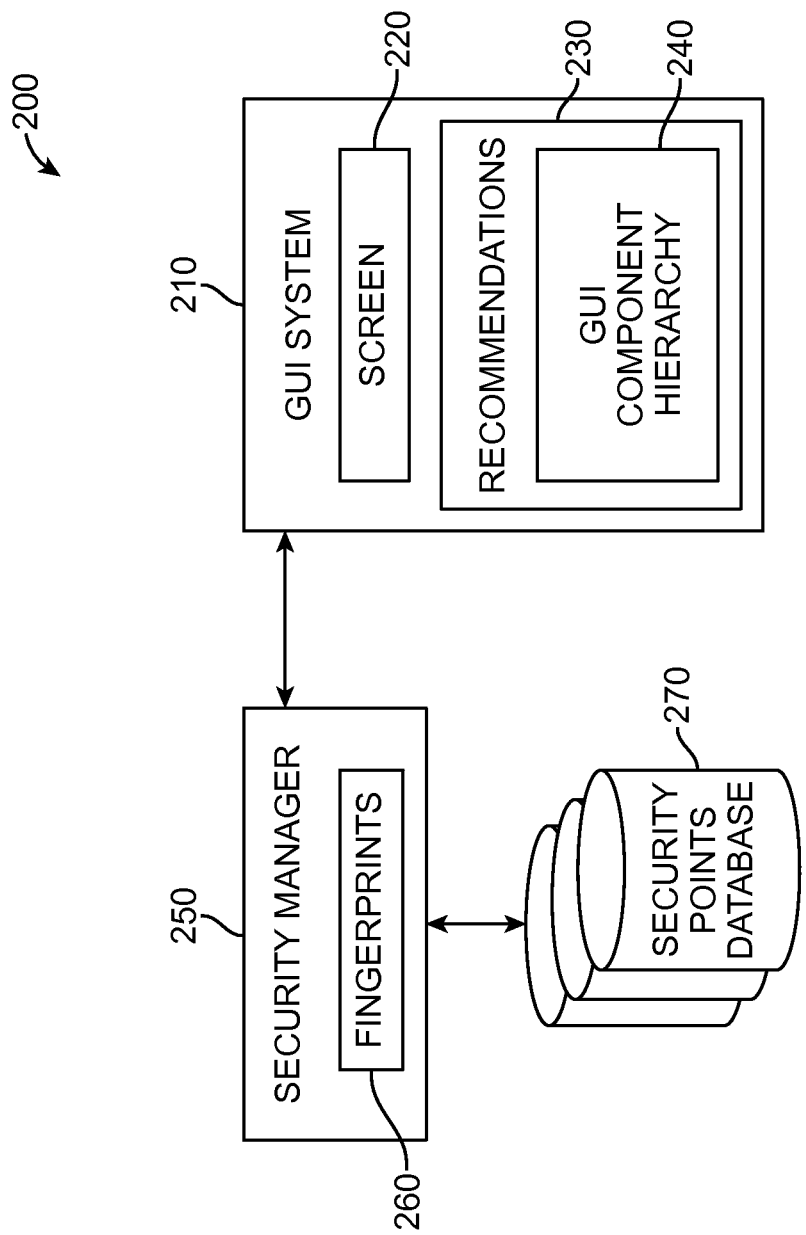
FIG. 4 illustrates a block diagram of an example security system, in accordance with an embodiment of the invention.

FIG. 4 illustrates a block diagram of an example security system 200, in accordance with an embodiment of the invention. In one embodiment, the security system 200 has at least two operating modes: a configuration mode and a usage mode. In the configuration mode, a user 20 may define one or more security areas 310 for a particular mobile app 50. In the configuration mode, the user 20 may also undefine one or more existing (i.e., previously defined) security areas 310 for a particular mobile app 50.

In the usage mode, the security system 200 monitors usage of one or more mobile apps 50, and blocks/locks any defined security areas 310. The security system 200 initiates a corresponding security action (e.g., activating a display prompting for access information) when a user 20 of the mobile device 30 interacts with a blocked/locked security area 310 (e.g., touching or clicking on the blocked/locked security area 310).

The security system 200 comprises a GUI system 210, a security manager module 250 and one or more databases 270. The GUI system 210 comprises a screen module 220 and a recommendations module 230. The screen module 220 is configured to receive a request to draw a GUI screen 610, and to draw the requested GUI screen 610 on the display 60 of the mobile device 30. In one embodiment, requests to draw a GUI screen 610 are triggered by an operating system of the mobile device 30. An app developer need not be concerned with modifying a mobile app 50 to handle actions associated with the drawing of GUI screens 610 on the display 60 of the mobile device 30.

When the security system 200 receives a request to draw a GUI screen 610 while in the configuration mode, the requested GUI screen 610 drawn allows a user 20 to define new security areas 310 or un-define any existing security areas 310. The security system 200 may identify existing security areas 310 on the requested GUI screen 610 using one or more visual effects (e.g., highlighting the border of each existing security area 310 using a different color) or animation effects (e.g., dynamically and continuously changing the transparency of each existing security area 310 between 100% transparency and opaque).

When the security system 200 receives a request to draw a GUI screen 610 while in the usage mode, the requested GUI screen 610 drawn includes blocked/locked security areas 310.

The recommendations module 230 comprises a GUI component hierarchy module 240 configured to generate a GUI component hierarchy tree 500 (FIG. 6) for a GUI screen 610 or an area within a GUI screen 610 ("GUI screen sub-area"). The GUI component hierarchy tree 500 comprises multiple nodes, wherein each node corresponds to a GUI component 300 within a GUI screen 610/GUI screen sub-area, and wherein the nodes are arranged based on locations of the GUI components 300 within the GUI screen 610/GUI screen sub-area. The screen module 220 draws a requested GUI screen 610 based on a GUI component hierarchy tree 500 generated for the requested GUI screen 610.

In the configuration mode, a user 20 may interact with a specific GUI screen sub-area to define or un-define one or more security areas 310 within the specific GUI screen sub-area. For example, the user 20 may define a particular GUI component 300 as a security area 310 by interacting with the GUI component 300 (e.g., tapping/clicking the GUI component 300). If a desired security area 310 is a GUI sub-component, the user 20 may specifically define the GUI sub-component as a security area 310 by tapping/clicking on the GUI sub-component multiple times. Therefore, a user 20 can traverse up and down nodes of a GUI component hierarchy tree 500 using multiple taps/clicks.

In the configuration mode, the recommendations module 230 may recommend security areas 310 to the user 20 by highlighting GUI components 300 within a requested GUI screen 610. When the user 20 interacts with a different GUI screen sub-area of the requested GUI screen 610, the GUI component hierarchy 240 generates a GUI component hierarchy tree 500 for the GUI screen sub-area, and recommends security areas 310 within the GUI screen sub-area based on the tree 500.

In the configuration mode, when the user 20 is finished defining one or more security areas 310 within an area of the requested GUI screen 610, the GUI system 210 forwards the user defined security areas 310 and corresponding GUI component hierarchy trees 500 to the security manager 250. The security manager 250 comprises a fingerprints module 260 for generating a corresponding fingerprint for each user defined security area 310. The security system 200 uses fingerprints to identify security areas 310.

In one embodiment, a fingerprint for a security area 310 is based on at least the following information: a specific component ID that corresponds to a GUI component 300 within the security area 310, and an application ID that corresponds to the mobile app 50 including the security area 310. The security manager 250 registers the defined security areas 310 by generating a corresponding fingerprint for each security area 310. The security manager 250 then stores the fingerprints for the defined security areas 310 in a database 270 corresponding to the mobile app 50. In one embodiment, each mobile app 50 has a corresponding database 270 for maintaining fingerprints identifying security areas 310 within the mobile app 50. When the security areas 310 are registered, the security manager 250 sends a notification to the GUI system 210 which in turn notifies the user 20 that the security areas 310 have been successfully defined.

In the usage mode, the GUI system 210 generates a GUI component hierarchy tree 500 for a requested GUI screen 610 of a mobile app 50 when the GUI system 210 receives a request to draw the requested GUI screen 610. The GUI component hierarchy tree 500 is forwarded to the security manager 250. The security manager 250 retrieves fingerprints for defined security areas 310 for the requested GUI screen 610 from a database 270 corresponding to the mobile app 50. The security manager 250 then compares the fingerprints retrieved against the GUI component hierarchy tree 500 to determine whether the requested GUI screen 610 includes any security areas 310. The security manager 250 forwards to the GUI system 210 component IDs for each GUI component 300 within each security area 310, if any. If the requested GUI screen 610 includes at least one security area 310, the GUI system 210 draws the requested GUI screen 610 with at least one blocked/locked security area 310. A user 20 cannot access an application function/content provided by a GUI component 300 within a blocked/locked security area 310 until the user 20 verifies/authenticates his/her identity.

Figure 5:
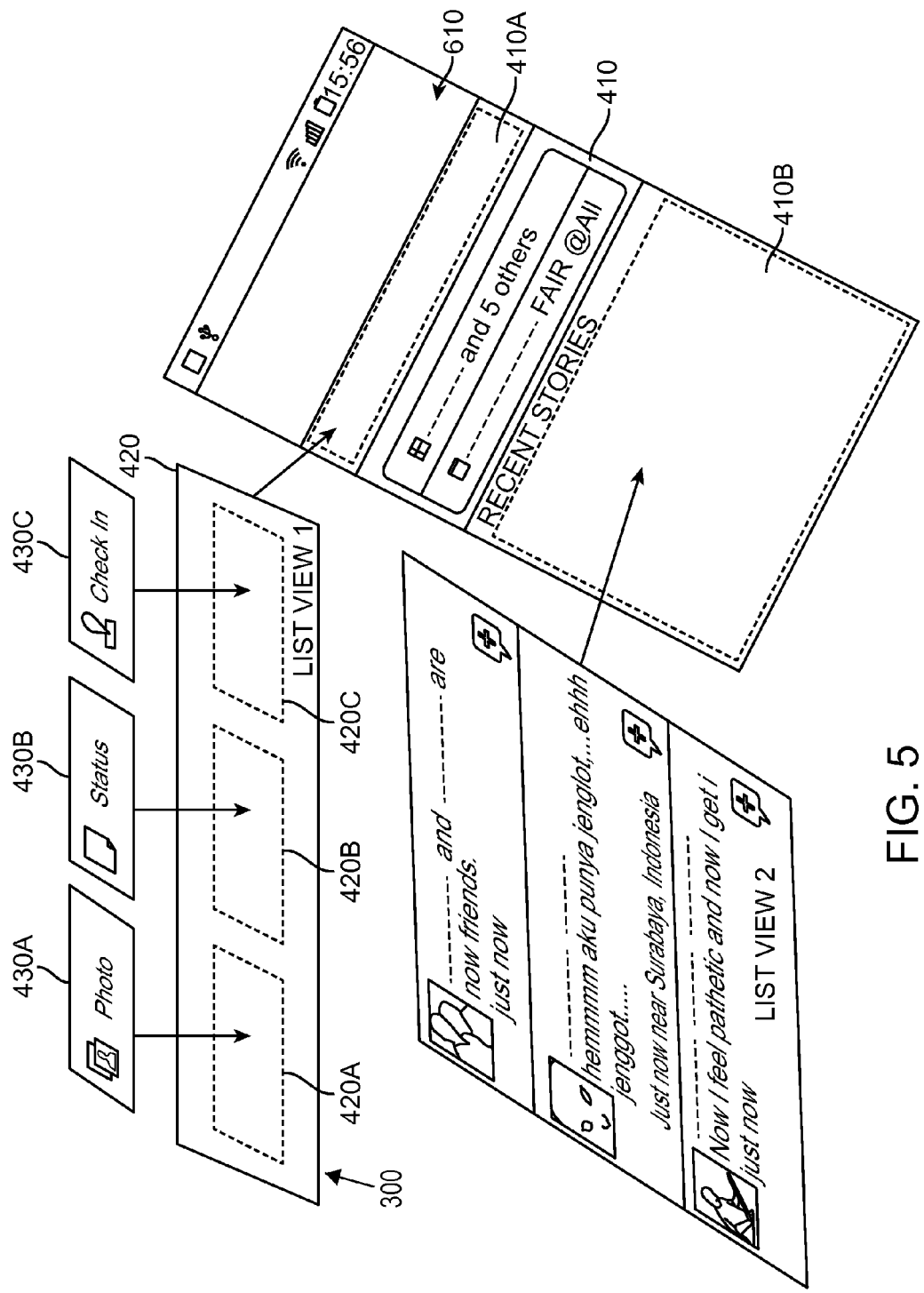
FIG. 5 illustrates different areas of the GUI screen in FIG. 3A, in accordance with an embodiment of the invention.

FIG. 5 illustrates different GUI screen sub-areas of the GUI screen 610 in FIG. 3A, in accordance with an embodiment of the invention. The root window 410 of the GUI screen 610 may be divided into multiple GUI screen sub-area, such as a first area 410A including the first list view 420, and a second area 410B including the second list view 420. When the user interacts with a particular GUI screen sub-area of the root window 410, the GUI system 200 generates a corresponding GUI component hierarchy tree 500 for the particular GUI screen sub-area.

Figure 6:
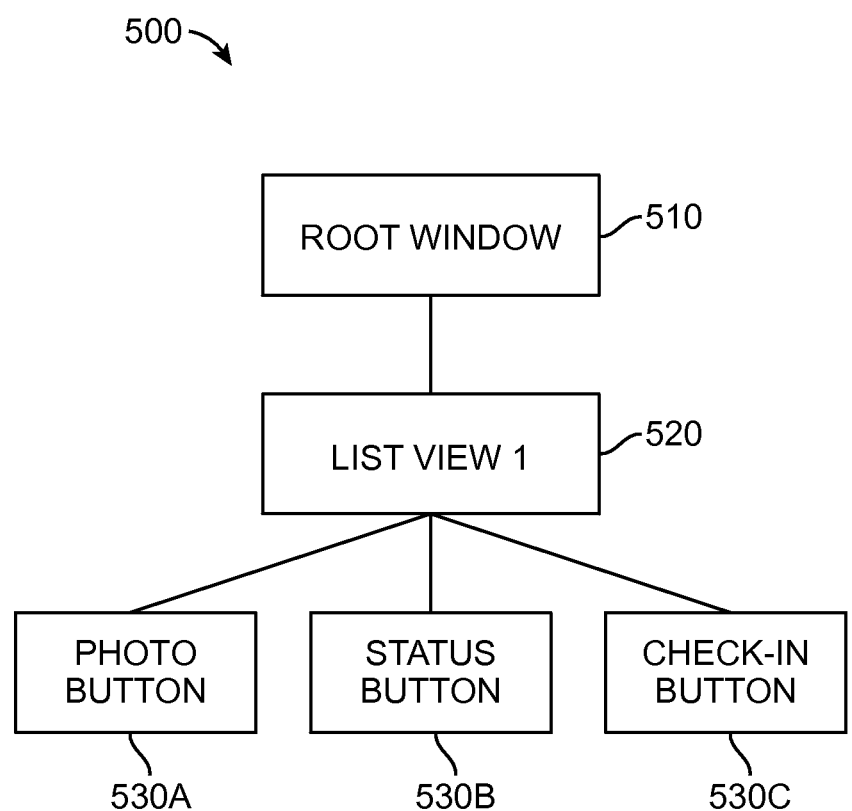
FIG. 6 illustrates an example a GUI component hierarchy tree, in accordance with an embodiment of the invention.

FIG. 6 illustrates an example GUI component hierarchy tree 500, in accordance with an embodiment of the invention. The GUI component hierarchy tree 500 in FIG. 6 corresponds to the first area 410A of the root window 410 shown in FIG. 5. The GUI component hierarchy tree 500 comprises a parent node 510 representing the root window 410, and a child node 520 representing the first list view 420 included the first area 410A. The GUI component hierarchy tree 500 further comprises multiple leaf nodes corresponding to the buttons 430 included in the first list view 410, such as a first leaf node 530A representing the photo button 430A, a second leaf node 530B representing the status button 430B, and a third leaf node 530C representing the check-in button 430C.

Figure 7:
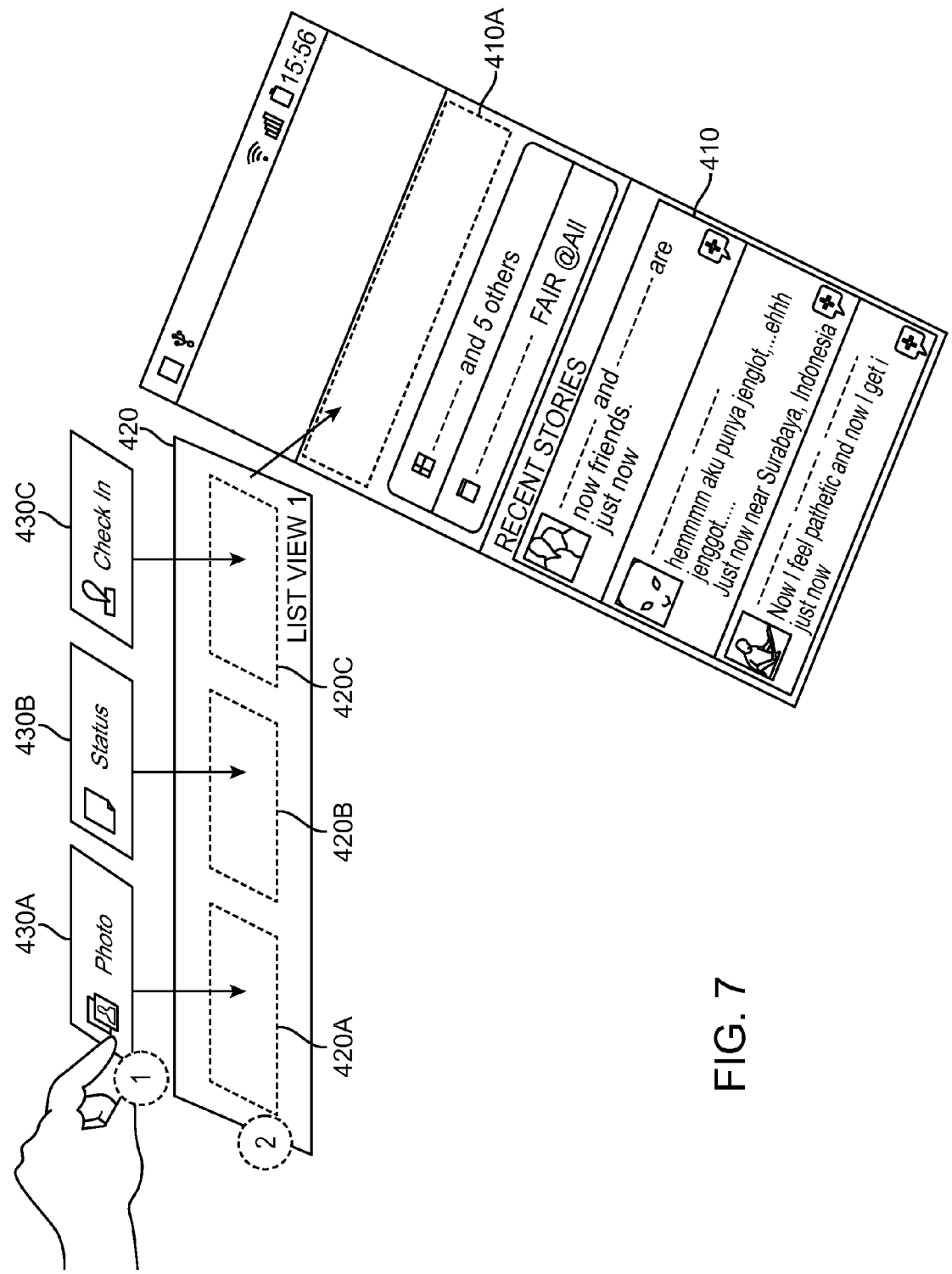
FIG. 7 illustrates example user interaction for defining one or more security areas 310, in accordance with an embodiment of the invention.

FIG. 7 illustrates example user interaction for defining one or more security areas 310, in accordance with an embodiment of the invention. When the security system 200 is in the configuration mode, a user 20 may define a particular GUI component 300 within the first area 410A as a security area 310 by touching/tapping the GUI component 300. When a user 20 touches/taps a GUI component 300, the GUI component 300 and all sub-components of the GUI component 300, if any, are selected as the desired security area 310. A GUI component hierarchy tree 500 for the first area 410A is generated. The GUI component hierarchy tree 500 includes nodes for all the selected components. The user 20 may traverse up the nodes of the GUI component hierarchy tree 500 using multiple taps. For example, when the user 20 touches/taps the GUI component 300 again, a parent of the GUI component 300 and all sub-components of the parent are selected as the desired security area 310.

As shown in FIG. 7, when the user 20 first touches/taps the photo button 430A as represented by action bubble 1, only the photo button 430A is selected as the desired security area 310 (the photo button 430A does not have any sub-components). When the user 20 touches/taps the photo button 430A again as represented by action bubble 2, the first list view 420 ("LIST VIEW 1") and all GUI components within the first list view 420 (i.e., the photo button 430A, the status button 430B and the check-in button 430C) are selected as the desired security area 310.

In another embodiment, a user 20 may define a security area 310 by drawing, using touch gesture, a bounding box around all GUI components 300 the user 20 wants to include in the desired security area 310. This allows the user 20 to simultaneously select multiple GUI components 300 as the desired security area 310.

In one embodiment, a user 20 may download one or more security configurations (e.g., off-the-shelf security configurations) for a particular mobile app 50 from a distribution platform (e.g., an application distribution platform 40). Each security configuration may originate from an app developer or a third party such as another user 20. Each security configuration includes one or more fingerprints representing recommended security areas 310 for a particular mobile app 50. The user 20 may install a security configuration in the security points database 270, and customize recommended security areas 310 provided by the security configuration as the user desires.

Figure 8B:
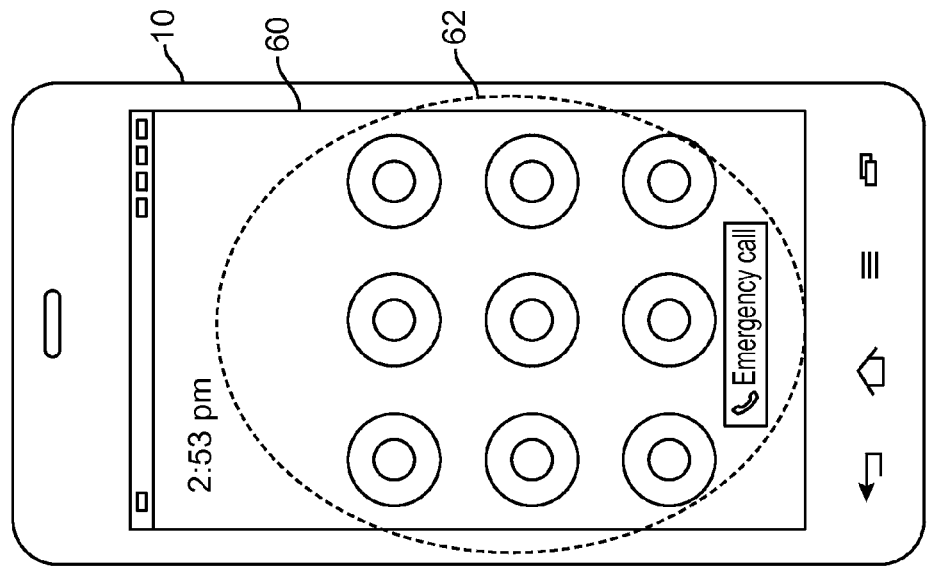
FIG. 8B illustrates an example display prompting a user to enter a pattern.
Figure 8A:
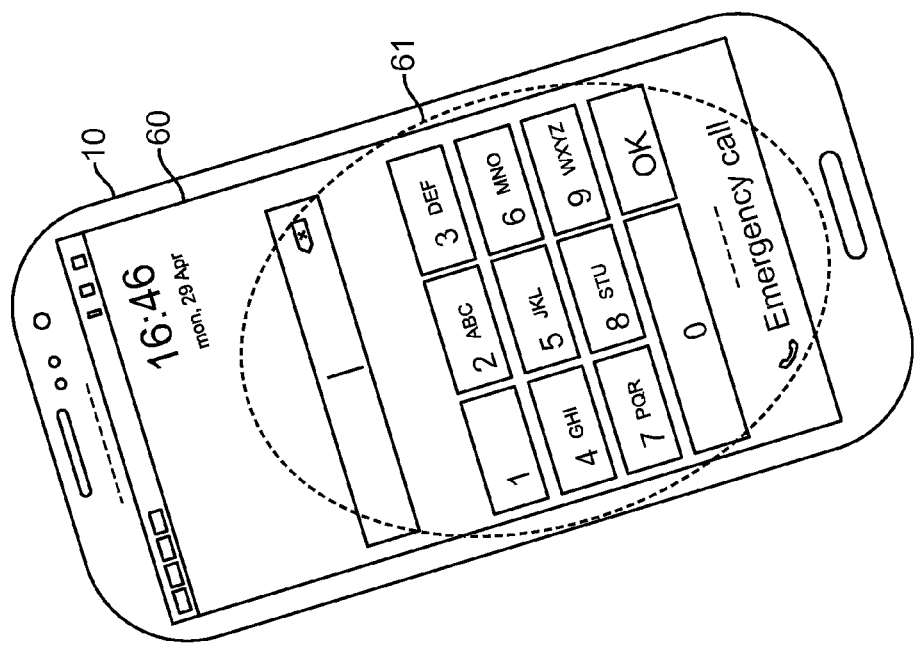
FIG. 8A illustrates an example display prompting a user to enter a PIN, in accordance with an embodiment of the invention.

FIG. 8A illustrates an example display 61 prompting a user to enter a PIN, in accordance with an embodiment of the invention. FIG. 8B illustrates an example display 62 prompting a user to enter a pattern, in accordance with an embodiment of the invention. As described above, in the usage mode, the security system 200 monitors user usage of one or more mobile apps 50 of a mobile device 30, and blocks any defined security areas 310. The security system 200 initiates a corresponding security action when a user 20 of the mobile device 30 interacts with a blocked security area 310. For example, the security system 200 may activate a display 61 prompting a user to enter a PIN when the user 20 wants to access an application function/content provided by a blocked GUI component 300 within a blocked security area 310. As another example, the security system 200 may activate a display 62 prompting the user to enter a pattern instead.

Figure 9:
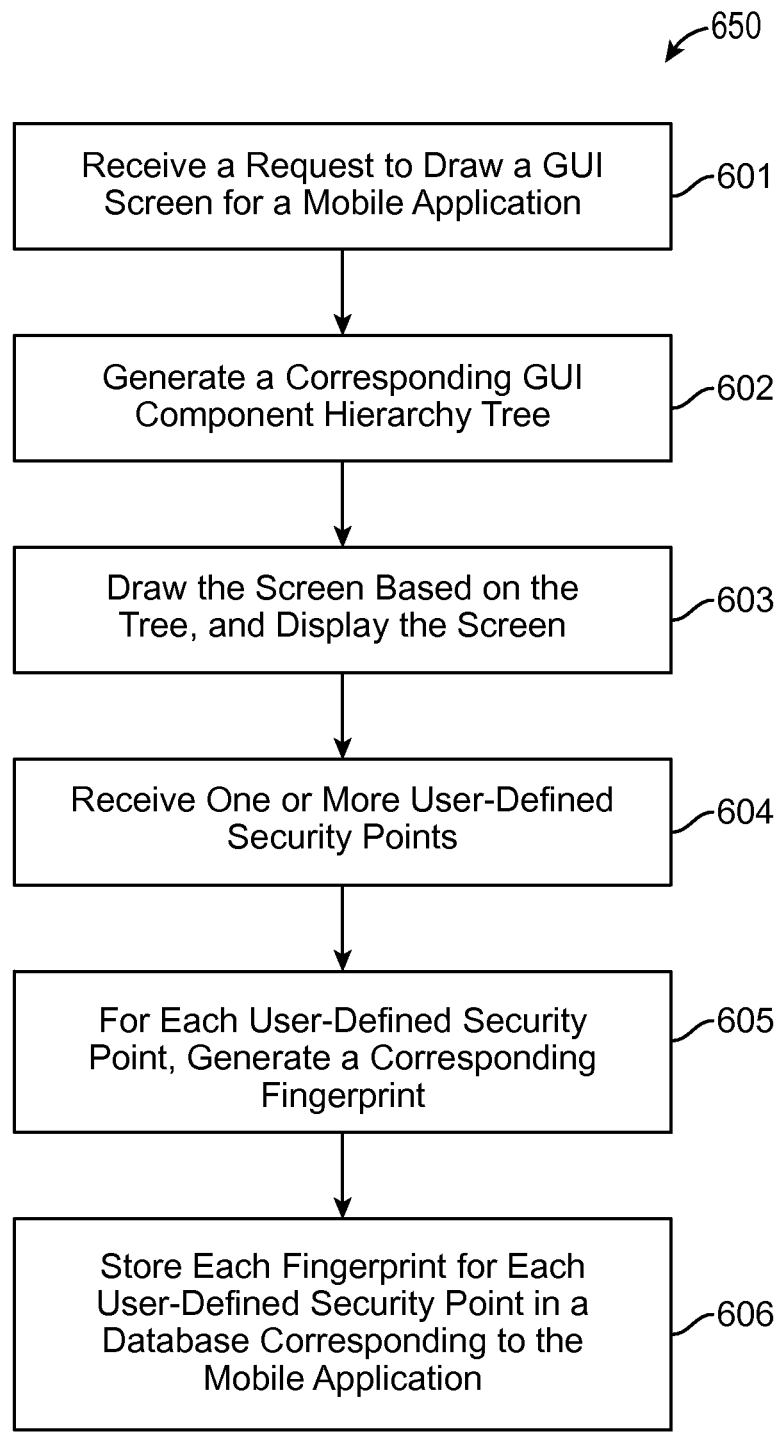
FIG. 9 illustrates an example flow chart for registering user-defined security points, in accordance with an embodiment.

FIG. 9 illustrates an example flow chart 650 for registering user-defined security points (i.e., security areas), in accordance with an embodiment. In process block 601, receive a request to draw a graphical user interface (GUI) screen for a mobile application. In process block 602, generate a corresponding GUI component hierarchy tree. In process block 603, draw the screen based on the tree, and display the screen. In process block 604, receive one or more user-defined security points. In process block 605, generate a corresponding fingerprint for each user-defined security point. In process block 606, store each fingerprint for each user-defined security point in a database corresponding to the mobile application.

Figure 10:
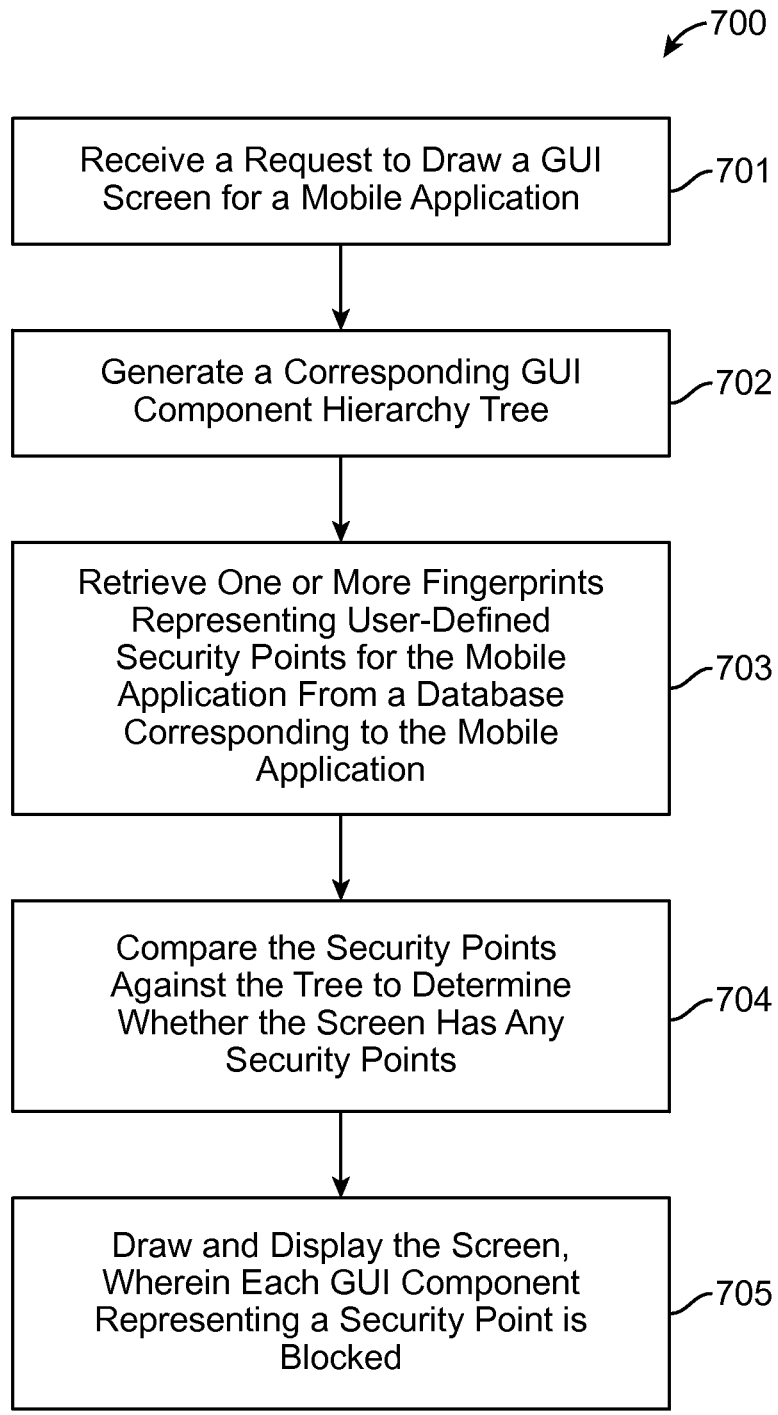
FIG. 10 illustrates an example flow chart for implementing a function-level lock, in accordance with an embodiment.

FIG. 10 illustrates an example flow chart 700 for implementing a function-level lock, in accordance with an embodiment. In process block 701, receive a request to draw a graphical user interface (GUI) screen for a mobile application. In process block 702, generate a corresponding GUI component hierarchy tree. In process block 703, retrieve one or more fingerprints representing user-defined security points for the mobile application from a database corresponding to the mobile application. In process block 704, compare the user-defined security points against the tree to determine whether the screen has any security points. In process block 705, draw and display the screen, wherein each GUI component representing a security point is blocked.

Figure 11:
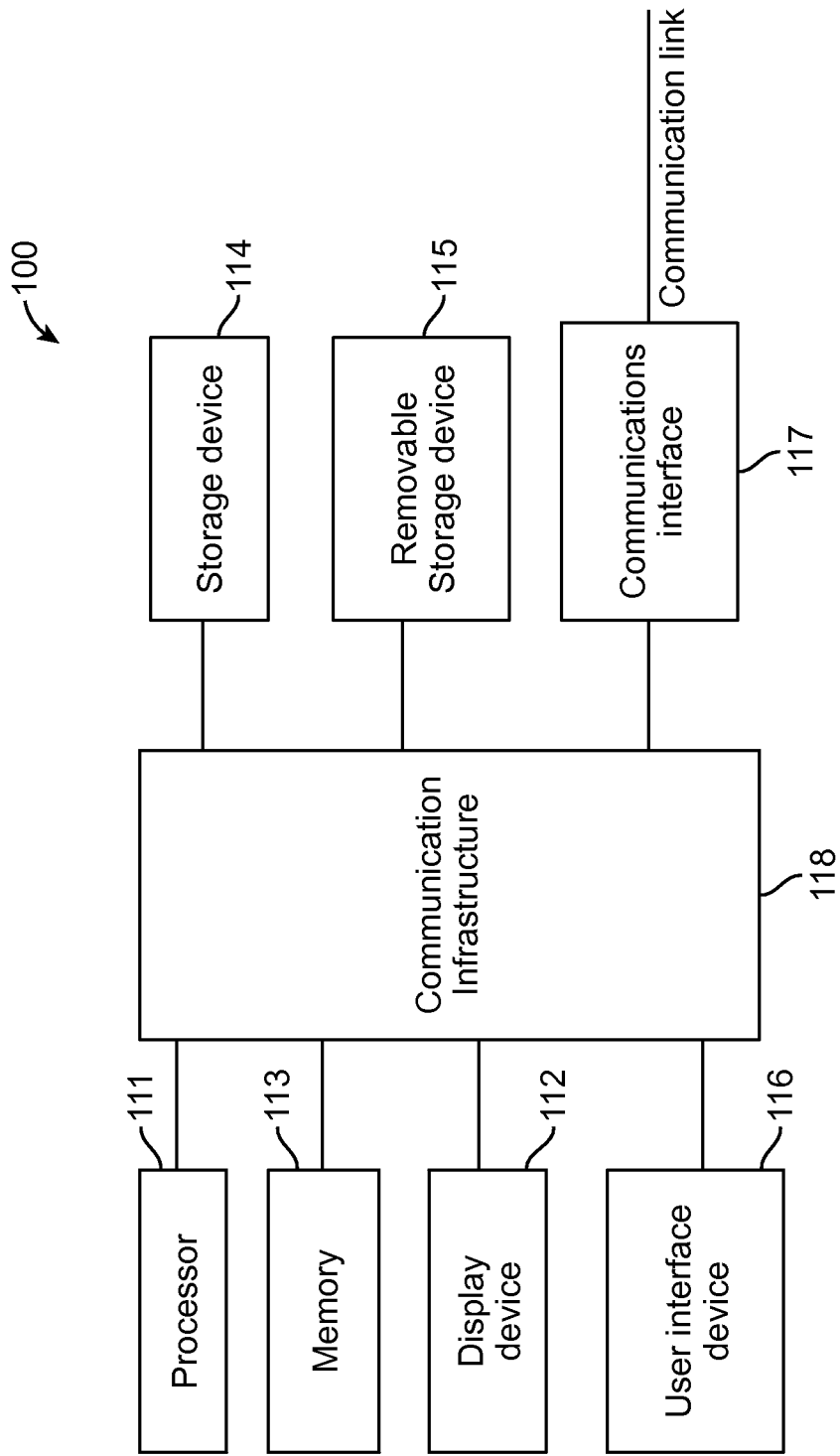
FIG. 11 is a high level block diagram showing an information processing system comprising a computer system useful for implementing an embodiment of the present invention.

FIG. 11 is a high level block diagram showing an information processing system comprising a computer system 100 useful for implementing an embodiment of the present invention. The computer system 100 includes one or more processors 111, and can further include an electronic display device 112 (for displaying graphics, text, and other data), a main memory 113 (e.g., random access memory (RAM)), storage device 114 (e.g., hard disk drive), removable storage device 115 (e.g., removable storage drive, removable memory module, a magnetic tape drive, optical disk drive, computer readable medium having stored therein computer software and/or data), user interface device 116 (e.g., keyboard, touch screen, keypad, pointing device), and a communication interface 117 (e.g., modem, a network interface (such as an Ethernet card), a communications port, or a PCMCIA slot and card). The communication interface 117 allows software and data to be transferred between the computer system and external devices. The system 100 further includes a communications infrastructure 118 (e.g., a communications bus, network) to which the aforementioned devices/modules 111 through 117 are connected.

Information transferred via communications interface 117 may be in the form of signals such as electronic, electromagnetic, optical, or other signals capable of being received by communications interface 117, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

What is claimed is:

1. An electronic mobile device, comprising:
  a mobile application, wherein the mobile application has a corresponding graphical user interface (GUI) screen for display on the electronic mobile device;
  one or more processors; and
  a non-transitory processor-readable memory device storing instructions that when executed by the one or more processors cause the one or more processors to perform operations including:
    registering one or more defined security areas of the mobile application by:
      generating a corresponding GUI component hierarchy tree comprising a hierarchy of GUI components included in the corresponding GUI screen in response to an interaction with the corresponding GUI screen, wherein each GUI component of a hierarchy of GUI components is displayed in the corresponding GUI screen;
      determining which one or more GUI components of the corresponding GUI screen are selected for locking based on the corresponding GUI component hierarchy tree; and
      maintaining corresponding security data on at least one database, wherein the corresponding security data represents one or more defined security areas of the mobile application, and each defined security area includes at least one GUI component of the corresponding GUI screen selected for locking; and securing the one or more defined security areas by:
in response to receiving a request to draw the corresponding GUI screen, drawing the corresponding GUI screen based on the corresponding security data and the corresponding GUI component hierarchy tree, wherein each GUI component of the corresponding GUI screen selected for locking is locked; and
permitting access to a locked GUI component of the corresponding GUI screen only in response to successful verification.

2. The electronic mobile device of claim 1, wherein: the at least one database corresponds to the mobile application, and the corresponding security data comprises one or more fingerprint identifications representing the one or more defined security areas of the mobile application.

3. The electronic mobile device of claim 1, wherein the securing the one or more defined security areas further comprises:
unlocking a locked GUI component of the corresponding GUI screen to permit access to the locked GUI component only in response to successful verification.

4. The electronic mobile device of claim 1, wherein the securing the one or more defined security areas further comprises:
prompting for verification in response to interaction with a locked GUI component of the corresponding GUI screen.

5. The electronic mobile device of claim 1, wherein the determining which one or more GUI components of the corresponding GUI screen are selected for locking further comprises:
detecting number of times a GUI component of the corresponding GUI screen is interacted with; and
traversing through the corresponding GUI component hierarchy tree based on the number of times the GUI component is interacted with to allow selection of one or more GUI components to be included in a defined security area of the mobile application.

6. The electronic mobile device of claim 2, wherein the registering one or more defined security areas of the mobile application further comprises:
generating a corresponding fingerprint identification for each defined security area of the mobile application based on the corresponding GUI component hierarchy tree, wherein the corresponding fingerprint identification comprises at least one of the following: a component identification of a GUI component of the corresponding GUI screen selected for locking, and an application identification of the mobile application; and
maintaining each fingerprint identification generated on the at least one database.

7. The electronic mobile device of claim 2, wherein the securing the one or more defined security areas further comprises:
retrieving the one or more fingerprint identifications from the at least one database; and
determining whether the corresponding GUI screen includes one or more defined security areas based on the one or more fingerprint identifications and the corresponding GUI component hierarchy tree.

8. The electronic mobile device of claim 1, wherein: access to a non-locked GUI component of the corresponding GUI screen is permitted without verification.

9. A method, comprising:
registering one or more defined security areas of a mobile application by:
generating a corresponding GUI component hierarchy tree comprising a hierarchy of GUI components included in a corresponding graphical user interface (GUI) screen of the mobile application in response to an interaction with the corresponding GUI screen, wherein each GUI component of a hierarchy of GUI components is displayed in the corresponding GUI screen;
determining which one or more GUI components of the corresponding GUI screen are selected for locking based on the corresponding GUI component hierarchy tree; and
maintaining corresponding security data, wherein the corresponding security data represents one or more defined security areas of the mobile application, and each defined security area includes at least one GUI component of the corresponding GUI screen selected for locking; and
securing the one or more defined security areas by:
in response to receiving a request to draw the corresponding GUI screen, drawing the corresponding GUI screen based on the corresponding security data and the corresponding GUI component hierarchy tree, wherein each GUI component of the corresponding GUI screen selected for locking is locked; and
permitting access to a locked GUI component of the corresponding GUI screen only in response to successful verification.

10. The method of claim 9, wherein the corresponding security data comprises one or more fingerprint identifications representing the one or more defined security areas of the mobile application.

11. The method of claim 9, wherein the securing the one or more defined security areas further comprises:
unlocking a locked GUI component of the corresponding GUI screen to permit access to the locked GUI component only in response to successful verification.

12. The method of claim 9, wherein the securing the one or more defined security areas further comprises:
prompting for verification in response to interaction with a locked GUI component of the corresponding GUI screen.

13. The method of claim 9, wherein the determining which one or more GUI components of the corresponding GUI screen are selected for locking further comprises:
detecting number of times a GUI component of the corresponding GUI screen is interacted with; and
traversing through the corresponding GUI component hierarchy tree based on the number of times the GUI component is interacted with to allow selection of one or more GUI components to be included in a defined security area of the mobile application.

14. The method of claim 10, wherein the registering one or more defined security areas of the mobile application further comprises:
generating a corresponding fingerprint identification for each defined security area of the mobile application based on the corresponding GUI component hierarchy tree, wherein the corresponding fingerprint identification comprises at least one of the following: a component identification of a GUI component of the corresponding GUI screen selected for locking, and an application identification of the mobile application; and maintaining each fingerprint identification generated on the at least one database.

15. The method of claim 10, wherein the securing the one or more defined security areas further comprises:

retrieving the one or more fingerprint identifications from the at least one database; and determining whether the corresponding GUI screen includes one or more defined security areas based on the one or more fingerprint identifications and the corresponding GUI component hierarchy tree.

16. The method of claim 9, further comprising:

permitting access to a non-locked GUI component of the corresponding GUI screen without verification.

17. A non-transitory computer readable storage medium that includes a program that when executed by a processor performs a method comprising:

registering one or more defined security areas of a mobile application by:

generating a corresponding GUI component hierarchy tree comprising a hierarchy of GUI components included in a corresponding graphical user interface (GUI) screen of the mobile application in response to an interaction with the corresponding GUI screen, wherein each GUI component of a hierarchy of GUI components is displayed in the corresponding GUI screen;

determining which one or more GUI components of the corresponding GUI screen are selected for locking based on the corresponding GUI component hierarchy tree; and maintaining corresponding security data, wherein the corresponding security data represents one or more defined security areas of the mobile application, and each defined security area includes at least one GUI component of the corresponding GUI screen selected for locking; and securing the one or more defined security areas by:

in response to receiving a request to draw the corresponding GUI screen, drawing the corresponding GUI screen based on the corresponding security data and the corresponding GUI component hierarchy tree, wherein each GUI component of the corresponding GUI screen selected for locking is locked; and permitting access to a locked GUI component of the corresponding GUI screen only in response to successful verification.

18. The non-transitory computer readable storage medium of claim 17, wherein the corresponding security data comprises one or more fingerprint identifications representing the one or more defined security areas of the mobile application.

19. The non-transitory computer readable storage medium of claim 17, wherein the securing the one or more defined security areas further comprises:

unlocking a locked GUI component of the corresponding GUI screen to permit access to the locked GUI component only in response to successful verification;

prompting for verification only in response to interaction with a locked component of the corresponding GUI screen; and permitting access to a non-locked component of the corresponding GUI screen without verification.

20. The non-transitory computer readable storage medium of claim 17, wherein the determining which one or more GUI components of the corresponding GUI screen are selected for locking further comprises:

detecting number of times a GUI component of the corresponding GUI screen is interacted with; and traversing through the corresponding GUI component hierarchy tree based on the number of times the GUI component is interacted with to allow selection of one or more GUI components to be included in a defined security area of the mobile application.

* * * * *